(12) United States Patent
Workman

(10) Patent No.: US 9,069,188 B2
(45) Date of Patent: Jun. 30, 2015

(54) SYSTEMS AND METHODS FOR SELECTIVELY REMOVABLE LENS LAMINATES

(76) Inventor: Anthony D. Workman, Salt Lake City, UT (US)

( * ) Notice: Subject to any disclaimer, the term of this patent is extended or adjusted under 35 U.S.C. 154(b) by 144 days.

(21) Appl. No.: 13/235,082

(22) Filed: Sep. 16, 2011

(65) Prior Publication Data

US 2013/0070195 A1    Mar. 21, 2013

(51) Int. Cl.
*G02C 7/10* (2006.01)
*G02C 7/16* (2006.01)
*G02C 7/08* (2006.01)

(52) U.S. Cl.
CPC ........ *G02C 7/105* (2013.01); *G02C 7/16* (2013.01); *G02C 7/086* (2013.01); *G02C 2202/16* (2013.01)

(58) Field of Classification Search
CPC .............................. G02C 7/16; G02C 2202/16
USPC ............... 351/41, 44–47, 51, 52, 57, 178
See application file for complete search history.

(56) References Cited

U.S. PATENT DOCUMENTS

| 5,502,516 A * | 3/1996 | Elterman .................. 351/47 |
| 6,113,233 A * | 9/2000 | Miller ....................... 351/46 |
| 6,277,229 B1 * | 8/2001 | Popat et al. ............. 156/230 |
| 2004/0229042 A1* | 11/2004 | Hooker .................. 428/412 |
| 2008/0309868 A1* | 12/2008 | Hodgson ................ 351/51 |

* cited by examiner

*Primary Examiner* — Huy K Mai
(74) *Attorney, Agent, or Firm* — Dax D. Anderson; Kirton McConkie

(57) ABSTRACT

A system and method for method applying a laminate to a lens. The laminate may be opaque, translucent or perforated. The laminate may cover a more than one side of the lens. The laminate may have an indicia thereon to show support for a country or team. The gap may be formed between the laminate and the edge of the lens. The laminate may be layered one on top of another. The method claimed is selecting a laminate with the desired properties i.e. magnifying lens, colored lens, lens with appropriate indicia, applying that laminate to a lens.

16 Claims, 8 Drawing Sheets

SYSTEMS AND METHODS FOR SELECTIVELY REMOVABLE LENS LAMINATES

CROSS REFERENCE TO RELATED APPLICATIONS

This application does not claim priority to a prior application.

BACKGROUND

Eyewear lens such as glasses, sunglasses, goggles, face shields, visors, helmet shields and the like are used to protect eyes from light, wind, debris, water and to enhance visual acuity. Glasses systems with interchangeable lenses were introduced which allowed a user to change the lenses depending on the lighting conditions, but such systems require the user to bring the expensive, breakable alternative lenses anyplace a change may be needed. Similarly, a user may have different glasses for different activities or even different conditions within the same activity.

SUMMARY

An exemplary embodiment comprises eyewear lens comprising a frame, a lens set within the frame and a laminate selectively and releaseably coupled to the lens wherein the laminate is perforated, transparent or translucent, and the laminate releaseably adheres to the lens. The lens may have ultraviolet ink is placed on a surface of the laminate, the ink providing an indicia.

An alternative exemplary embodiment further comprises the laminate layer wrapping around both sides of the lens.

An alternative exemplary embodiment comprises a system of two independent laminates being placed on both surfaces of the lens.

An alternative exemplary embodiment comprises a system where two laminates are layered one on top of the other.

DETAILED DESCRIPTION OF EXEMPLARY EMBODIMENTS

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Figure 1:
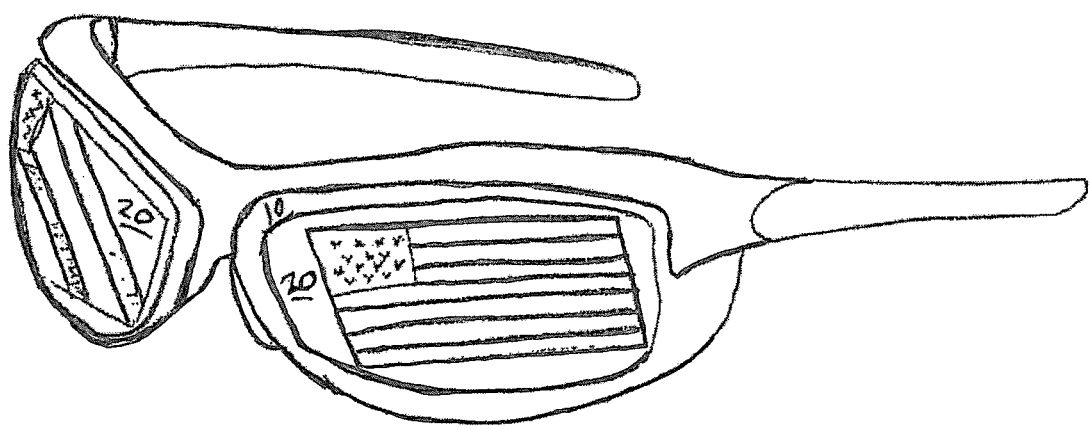
FIG. 1 illustrates an eyewear lens and laminate system according to certain exemplary embodiments.

FIG. 1 illustrates an eyewear lens and laminate system according to certain exemplary embodiments. The lens 10 in FIG. 1 are in glasses. The glasses may be sun glasses, reading glasses, specialty glasses used for a specific activity, or any other type of glasses that are commonly known in the art. The laminate 20 is a perforated laminate that is sized to be smaller than the surface area of the eyewear lens. Alternative exemplary embodiments teach a laminate 20 that is a translucent film. The laminate 20 is placed on the surface of the lens. The laminate may be removed as desired by the user. The user can selectively remove and replace the laminate on the eyewear lens and modify any eyewear desired. The user can replace the laminate 20 with another laminate to achieve the desired effect. For example, a user may elect to secure a laminate with a certain diameter perforation on a bright and sunny day. However, the user may later be in an environment with less light and desire a laminate that transmits a greater amount of light, and replace the selectively releasable laminate with a different, more desirable laminate.

Alternatively, the user may elect to secure laminates to a lens that convey a desired meaning to others. If the user is at a sporting event the user may elect to secure indicia related to the team he or she supports. If the user supports multiple teams then, using the same glasses, different laminates can be placed upon the glasses to express the support for the team.

Alternatively, an Olympic athlete for a country may desire to express support for his or her country, again, the eyewear lens can be modified to allow support to be shown without damaging the eyewear lens.

Figure 2:
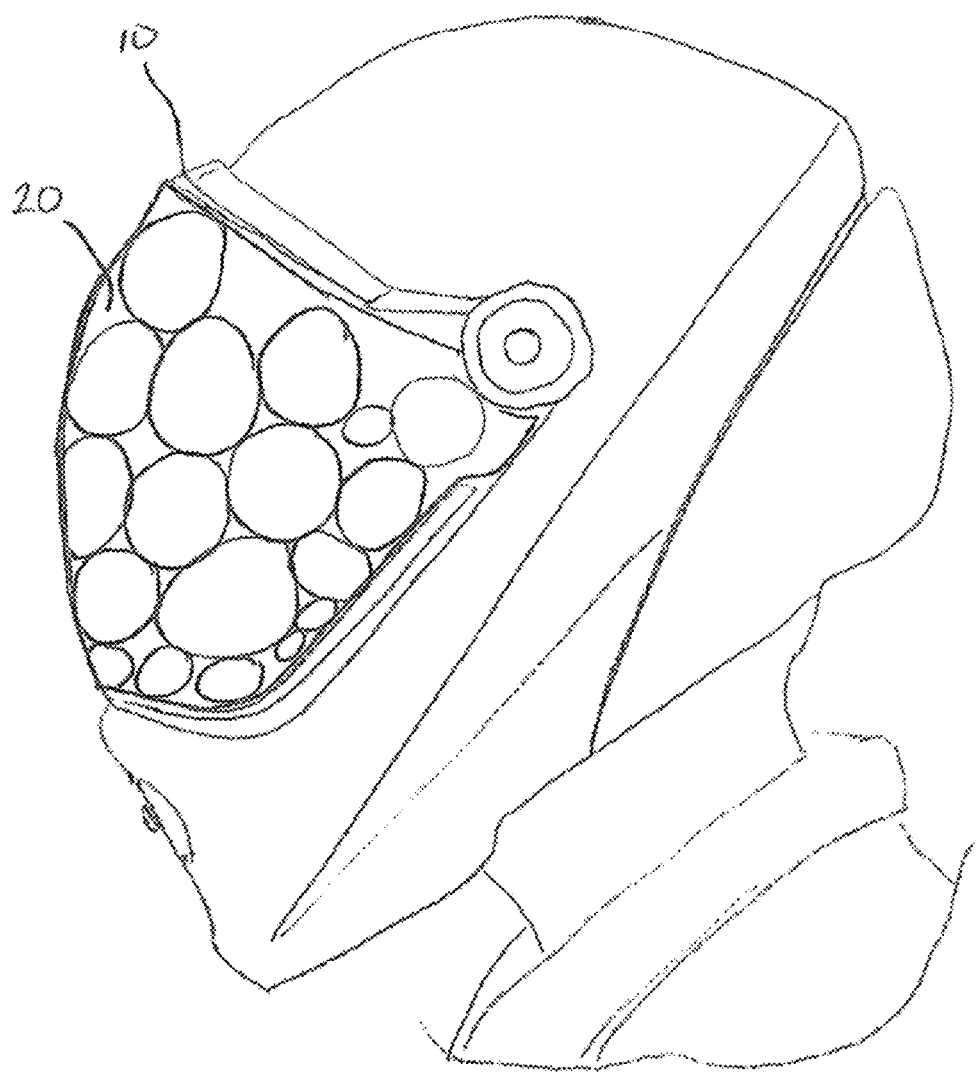
FIG. 2 illustrates alternative eyewear lens and laminate system comprising the eyewear lens and laminate system according to exemplary embodiments.

FIG. 2 illustrates alternative eyewear lens and laminate system comprising the eyewear lens and laminate system according to exemplary embodiments. In FIG. 2 the lens is coupled to a helmet. The laminate can be secured to the lens using techniques known in the art. The laminate may be precisely cut to the size of the lens, or its area may be smaller or larger than the area of the lens. Where the area of the laminate is greater than the area of the lens the laminate may be cut to permit the functionality of the lens. Alternatively the area of the laminate may extend beyond the edge of the lens and be unsecured to achieve a desired visual effect, in which case additional adhesive may be required by the environmental conditions such as a wind or excessive movement by the wearer.

Figure 3:
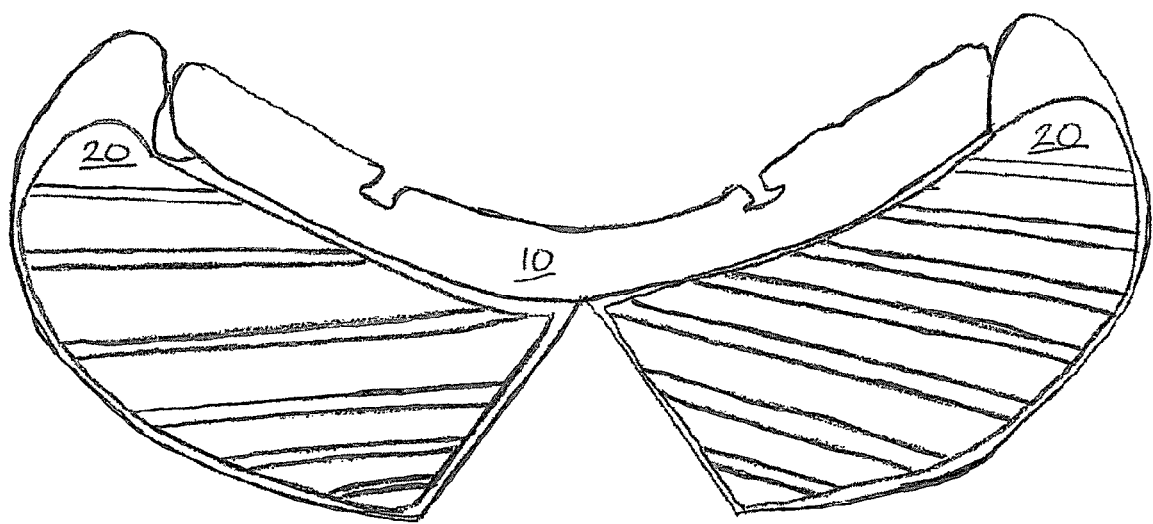
FIG. 3 illustrates alternative eyewear lens and laminate system comprising the eyewear lens and laminate system according to exemplary embodiments.

FIG. 3 illustrates alternative eyewear lens and laminate system comprising the eyewear lens and laminate system according to exemplary embodiments. FIG. 3 illustrates clipon eyewear lens which can be coupled to a helmet. In this exemplary embodiment, as with other embodiment, the laminate can be placed on the side of the eyewear lens that is closest to the wearer's eyes while being worn, what would be called the inside of the lens.

Figure 4:
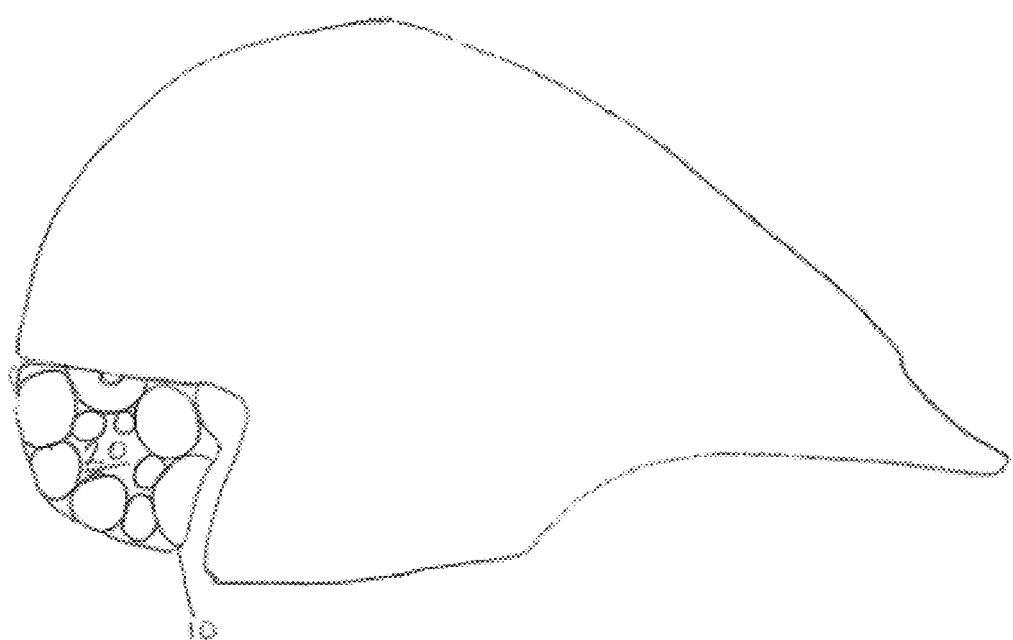
FIG. 4 illustrates alternative eyewear lens and laminate system comprising the eyewear lens and laminate system according to exemplary embodiments.

FIG. 4 illustrates alternative eyewear lens and laminate system comprising the eyewear lens and laminate system according to exemplary embodiments. FIG. 4 illustrates eyewear lens that is integrated into a helmet. The system in this instance functions similarly to alternative exemplary embodiments already discussed. The laminate may be cut precisely to the shape and size of the lens so as to leave about between a small gap to no gap between the edge of the laminate and the edge of the lens. Alternatively the area of the laminate may be less than the surface of the lens.

Figure 5:
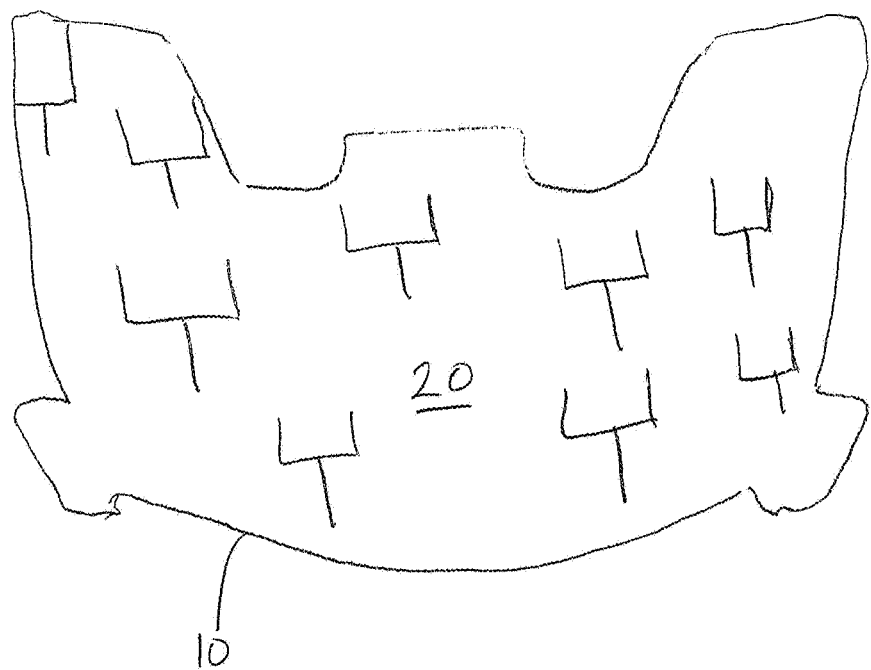
FIG. 5 illustrates alternative eyewear lens and laminate system comprising the eyewear lens and laminate system according to exemplary embodiments.

FIG. 5 illustrates alternative eyewear lens and laminate system comprising the eyewear lens and laminate system according to exemplary embodiments. The lens in FIG. 5 is a football helmet visor lens. The laminate in this instance has substantially the same structure and function as the eyewear lens laminate system discussed in other alternative exemplary embodiments.

Figure 6:
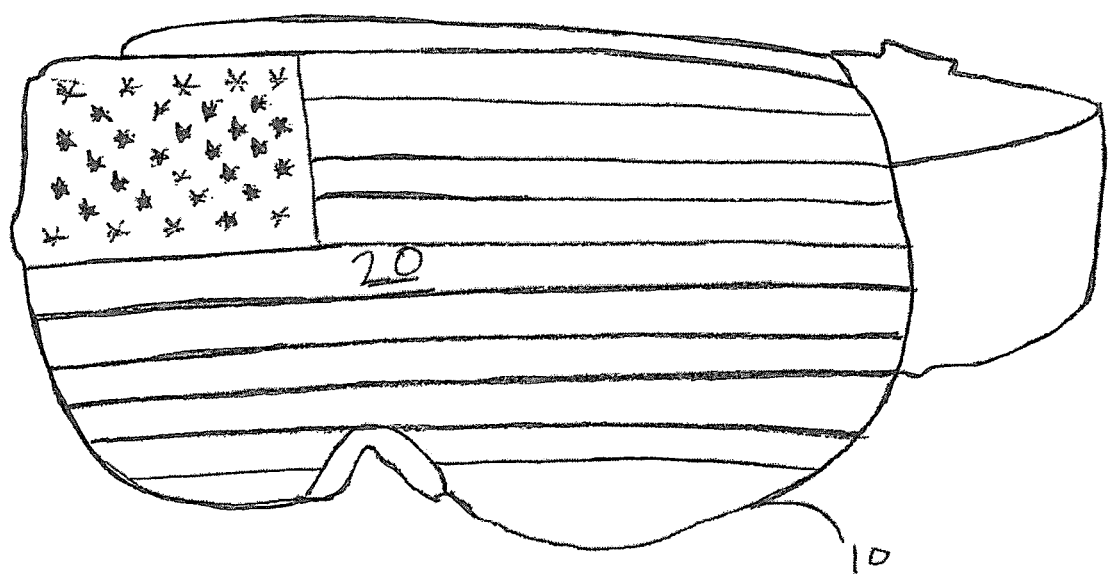
FIG. 6 illustrates alternative eyewear lens and laminate system comprising the eyewear lens and laminate system according to exemplary embodiments.

FIG. 6 illustrates alternative eyewear lens and laminate system comprising the eyewear lens and laminate system according to exemplary embodiments. The lens in FIG. 6 is a goggle lens which may be used for skiing, motorcycling, or for eye protection in different activities such as paintball. To ensure the system will adhere in inclement weather such as snow or rain the laminate may be wrapped around a plurality of lens surfaces. Alternatively, the lens may be secured by mechanical means such as clips, or by an adhesive. The laminate may also cling to the surface of the lens without additional aids.

Figure 7:
FIG. 7 illustrates an exemplary laminate comprising a perforated laminate.

FIG. 7 illustrates an exemplary laminate comprising a perforated laminate. The laminate 20 may be a perforated laminate as illustrated. The size of the perforation is determined in manufacturing. A plurality of perforated laminates may be layered to modulate the amount of light transmitted through the perforation holds. For example, if a single laminate is placed on the surface of a lens then the amount of light transmitted through the perforations will depend on the amount of unobstructed space there is on the laminate. If a second laminate is placed on top of the first, thereby covering a certain number of perforations then less light will be transmitted through the lens. The user can modulate the amount of light transmitted through the lens by selecting laminates with different perforation hole sizes or by layering multiple laminates on top of each other.

An alternative exemplary embodiment teach a laminate that is translucent. A translucent laminate limits the transmission of some light through the laminate film. A translucent laminate may be a uniform color. Alternatively it may utilize translucent ink, allowing the user to display indicia on the surface or surfaces of the glasses lens.

Figure 8A:
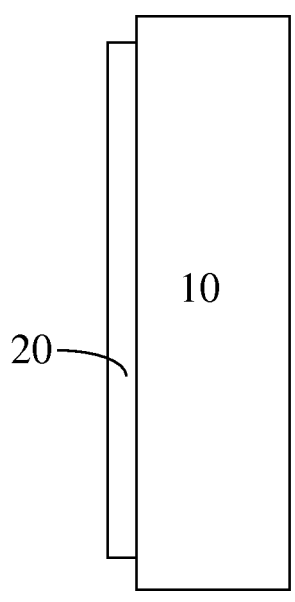
FIG. 8A illustrates a lens with a laminate on a surface.

FIG. 8A illustrates a lens 10 with a laminate 20 on one lens surface. In this exemplary embodiment the area of the laminate 10 is less than the area of the lens surface 20, thus forming a gap between the laminate and the lens. Providing a gap between the laminate and the lens allows the user to more easily selectively release the laminate from the lens. This can be repeated as often as the user desires, allowing the desired indicia or colored laminate to be selected and applied to the eyewear lens as desired by the user.

Figure 8B:
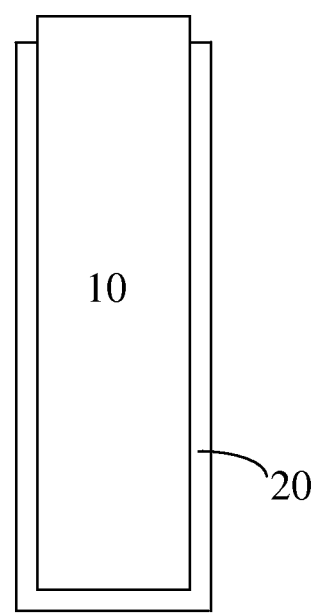
FIG. 8B illustrates a lens with a laminate on a plurality of surfaces.

FIG. 8B illustrates a lens with a laminate on a plurality of surfaces. In this exemplary embodiment the laminate 20 wraps around the lens 10 so as to cover a portion of the lens' first surface and the lens's second surface. This exemplary embodiment provides several advantages. In certain alternative exemplary embodiments, the greater the area of contact below the lens and the laminate, the stronger the bond. In certain exemplary embodiments the entire surface of the laminate naturally adheres to the lens surface. Thus where there is more laminate in contact with the lens the stronger the bond between the laminate and the lens. In certain alternative exemplary embodiments an area less than the entire surface area of the laminate adheres to the lens. In these alternative exemplary embodiments a portion of the laminate's surface is modified so as to reduce the adhering properties.

Another advantage of the exemplary embodiment illustrated in FIG. 8B is the ability of the user to modulate the light transmission properties. If the laminate selected and applied to the lens by the user is transparent then the user may layer the laminate either one on top of the other, or alternatively, one on each side of the lens as shown in FIG. 8B. A user may similarly apply two separate laminates, one on each side of the lens. The lens may be wrapped around the lens to cover either the entire lens or a portion of the lens.

In addition to modulating the light transmitted though the glasses, the user may also modify the color of the lens to optimize the view. In an alternative exemplary embodiment, a user may take several different laminates to an activity such as skiing. If the sunlight is intense the user may select a heavily tinted laminate, a perforated laminate or a combination of the two to reduce the amount of light being transmitted through the lens of the goggles or glasses. However, if a cloud cover comes in later in the day, and the light is flat, then the user can remove the heavily tinted or perforated laminates and replace them with a colored laminate that helps increase the view of the terrain. Thus the skier is able to replace a pack of breakable lenses or several different goggles with him or her while skiing with a thin pack of laminates. The skier is prepared for all light conditions while only carrying one simple thin set of laminates.

The laminates provide protection to the lens they cover. Many glasses are made using expensive lenses. When the lenses are scratched the glasses may be unusable. The laminates provide additional protection to a covered lens.

The laminate may be polarized. If a user desires to have a laminate for specified applications such as fishing, but prefers non-polarized applications, such as reading, the user may apply a polarized laminate to the glasses when desired.

The laminate may be shaped to magnify the view through the glasses. A user may apply a magnifying laminate when needed and remove it when not needed. For example, if while fishing a user is tying a hook onto his or her line, the user may want a magnified view of the hook and line. The laminate permits the lens to act as a magnifying lens and thus avoid having to have multiple glasses or even the use of permanent bifocal lenses.

Although specific embodiments and applications of the invention have been described in this specification, these embodiments and applications are exemplary only, and many variations are possible.

I claim:

1. Eyewear lens and laminate system comprising:
   a lens;
   a selectively releaseable perforated laminate coupled to the lens;
   ink bonded to the perforated laminate; and
   a transparent laminate coupled to the ink.

2. The system of claim 1 wherein the ink comprises translucent ink.

3. The system of claim 1 wherein the ink further comprises indicia.

4. The system of claim 1 further comprising a glasses lens.

5. The system of claim 1 further comprising a goggles lens.

6. The system of claim 1 wherein an adhesive is used to improve the bond strength between the laminate and a bonding surface.

7. The system of claim 1, where the laminate is perforated with uniformly sized holes in a uniform pattern.

8. The system of claim 1 wherein a plurality of laminates are layered.

9. Eyewear lens and laminate system comprising:
 a lens;
 a perforated laminate selectively and releaseably coupled to the lens;
 ultraviolet ink bonded to the perforated laminate; and
 a transparent laminate applied to the ultraviolet ink and perforated laminate.

10. The system of claim 9 wherein the ink and laminate are tinted.

11. The system of claim 9 wherein the ink and laminate are colored.

12. The system of claim 9 wherein ink is uniformly printed on the laminate.

13. A method of utilizing a selectively releasable laminate on a lens comprising:
 providing a lens;
 applying a first perforated laminate selectively and releasably coupleable to the lens, the perforated laminate further comprising ultraviolet ink applied thereto; and
 applying a transparent laminate to the ultraviolet ink.

14. The method of claim 13 further comprising wrapping the laminate around a plurality of lens surfaces.

15. The method of claim 13 further comprising placing a second laminate over the first laminate.

16. The method of claim 15 further comprising selecting the first laminate having a first aperature size of the first laminate's perforations and selecting a second laminate having aperatures a different size from the first laminate.

\* \* \* \* \*